(12) United States Patent
Shimizu (10) Patent No.: US 12,170,151 B2
(45) Date of Patent: Dec. 17, 2024

(54) COLLISION PROTECTION SLAB ABOVE SPENT FUEL POOL

(71) Applicant: Hitachi-GE Nuclear Energy, Ltd., Hitachi (JP)

(72) Inventor: Yusuke Shimizu, Hitachi (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 0 days.

(21) Appl. No.: 17/703,689

(22) Filed: Mar. 24, 2022

(65) Prior Publication Data

US 2022/0310279 A1    Sep. 29, 2022

(30) Foreign Application Priority Data

Mar. 25, 2021 (JP) .................................. 2021-051566

(51) Int. Cl.
*G21C 19/07* (2006.01)
*G21C 19/32* (2006.01)
*G21C 19/40* (2006.01)

(52) U.S. Cl.
CPC ............. *G21C 19/07* (2013.01); *G21C 19/32* (2013.01); *G21C 19/40* (2013.01)

(58) Field of Classification Search
CPC ......... G21C 19/07; G21C 19/32; G21C 19/40
USPC ........................................................ 376/272
See application file for complete search history.

(56) References Cited

U.S. PATENT DOCUMENTS

| 2012/0106692 A1* | 5/2012 | Keenan | G21C 19/07 376/203 |
| 2016/0035444 A1* | 2/2016 | Singh | G21C 19/07 376/272 |
| 2021/0057118 A1* | 2/2021 | Singh | G21C 19/40 |

FOREIGN PATENT DOCUMENTS

| JP | 2015-21848 A | 2/2015 |
| JP | 2015-529324 A | 10/2015 |
| WO | WO 2014/028634 A1 | 2/2014 |

OTHER PUBLICATIONS

IAEA , "Storage of water reactor spent fuel in water pools" 1982. (Year: 1982).*
Jalil, "The status of storage of spent fuel from reactors. Bangladesh perspective", No. IAEA-CN-102/3P, pp. 453-459, 2003. ( Year: 2003).*
Japanese-language Office Action issued in Japanese Application No. 2021-051566 dated Jul. 11, 2023 with English translation (9 pages).

* cited by examiner

*Primary Examiner* — Jack W Keith
*Assistant Examiner* — Daniel Wasil
(74) *Attorney, Agent, or Firm* — Crowell & Moring LLP (57) ABSTRACT

A reactor building includes a spent fuel pool, spent fuel racks, and traveling rails. The spent fuel racks are located in the spent fuel pool and are configured to store nuclear spent fuel. A protection slab is located above the spent fuel racks. The traveling rails are fixed to a lower surface of the protection slab. The rails are parallel to each other. The spent fuel racks are located between the rails. A fuel transfer machine is suspended from the rails.

12 Claims, 9 Drawing Sheets

CROSS-SECTIONAL VIEW · CROSS-SECTIONAL VIEW · CROSS-SECTIONAL VIEW

PLAN · PLAN · PLAN

COLLISION PROTECTION SLAB ABOVE SPENT FUEL POOL

TECHNICAL FIELD

The present invention relates to a reactor building and a spent fuel removal method.

BACKGROUND ART

In a reactor building, spent fuel racks for storing spent fuel are provided in a spent fuel pool. The spent fuel pool is open above the spent fuel racks in order to carry in the spent fuel taken out of a reactor. Therefore, even if there is a falling object into the spent fuel pool due to, for example, external missiles such as an aircraft colliding with the reactor building, the spent fuel stored in the spent fuel racks cannot be protected. An invention that solves this problem is disclosed in PTL 1.

CITATION LIST

Patent Literature

PTL 1: JP-A-2015-21848

SUMMARY OF INVENTION

Technical Problem

The reactor building described in PTL 1 is built of reinforced concrete or steel plate concrete, and is provided with shielding blocks for opening that close an upper opening of the spent fuel pool, and the shielding blocks for opening protect the spent fuel from a falling object.

However, in the reactor building in PTL 1, it is necessary to perform an operation of removing the shielding blocks for opening from the upper opening of the spent fuel pool upon starting an operation of taking out the spent fuel from the reactor and moving the spent fuel to spent fuel racks in the spent fuel pool (hereinafter, referred to as "spent fuel removal"), and it is necessary to secure a space for temporarily storing the removed shielding blocks for opening.

After the spent fuel removal is completed, it is also necessary to perform an operation of returning the removed shielding blocks for opening to the upper opening. That is, the technique in PTL 1 has room for improvement from the viewpoints of saving an operation time and securing an operation space.

An object of the invention is to provide a reactor building capable of shortening a time required for spent fuel removal while protecting the spent fuel stored in a spent fuel pool from a falling object.

Solution to Problem

In order to achieve the above object, a reactor building according to the invention includes a spent fuel pool, a spent fuel rack located in the spent fuel pool and configured to store spent fuel, and a protection slab located above the spent fuel rack and configured to cover the spent fuel pool.

Advantageous Effect

According to the invention, it is possible to shorten the time required for the spent fuel removal while protecting the spent fuel stored in the spent fuel pool from a falling object.

DESCRIPTION OF EMBODIMENTS

Hereinafter, configurations and operations of reactor buildings according to first to third embodiments of the invention will be described with reference to the drawings. In the drawings, the same reference numerals denote the same parts. Each of the plans and cross-sectional views specifies directions by XYZ axes orthogonal to each other, and specifies +X as "right", -X as "left", +Y as "up", -Y as "down", +Z as "front" and -Z as "rear".

First Embodiment

Figure 1:
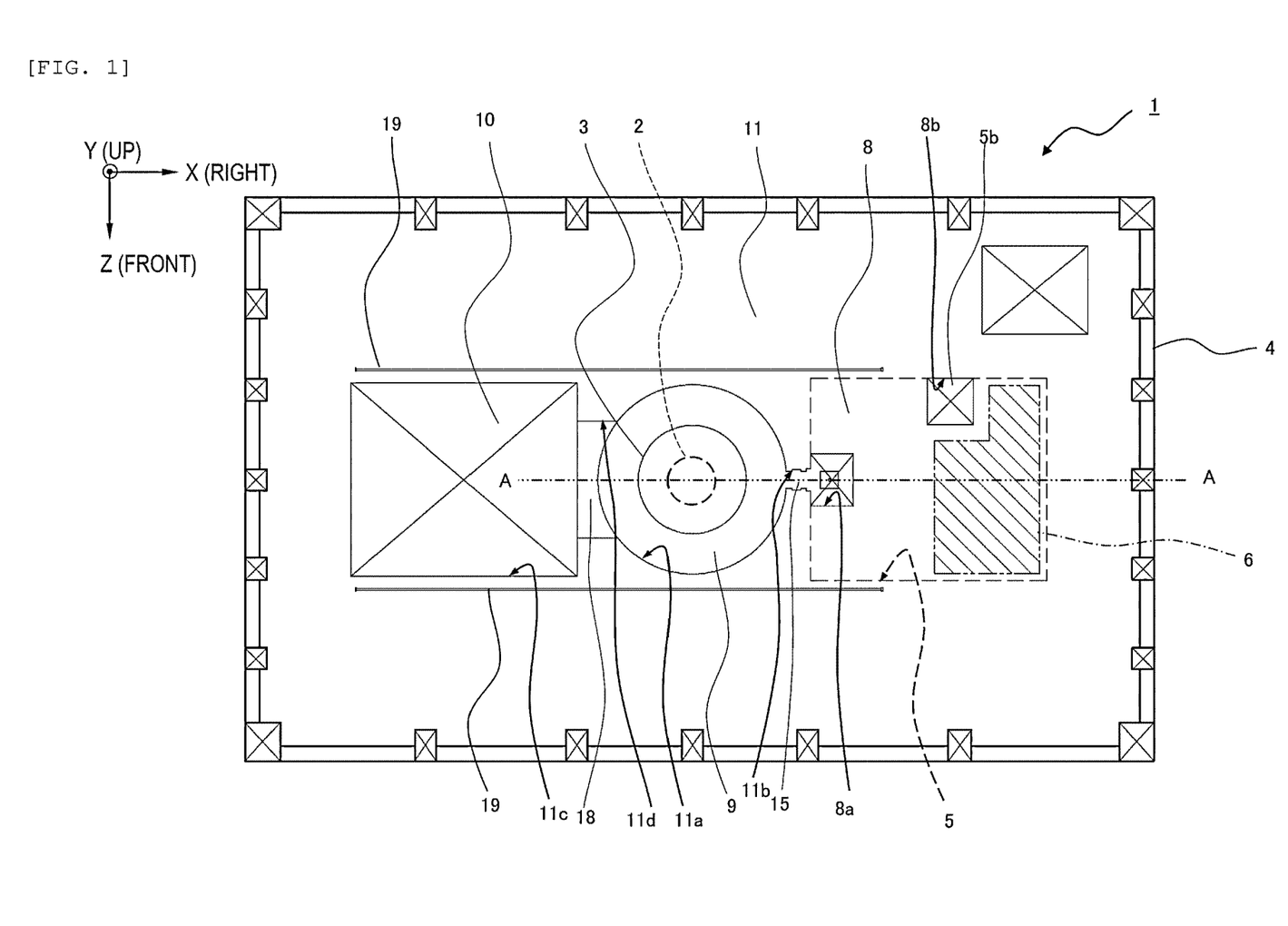
FIG. 1 is a plan showing an operating deck of a reactor building according to a first embodiment.
Figure 2:
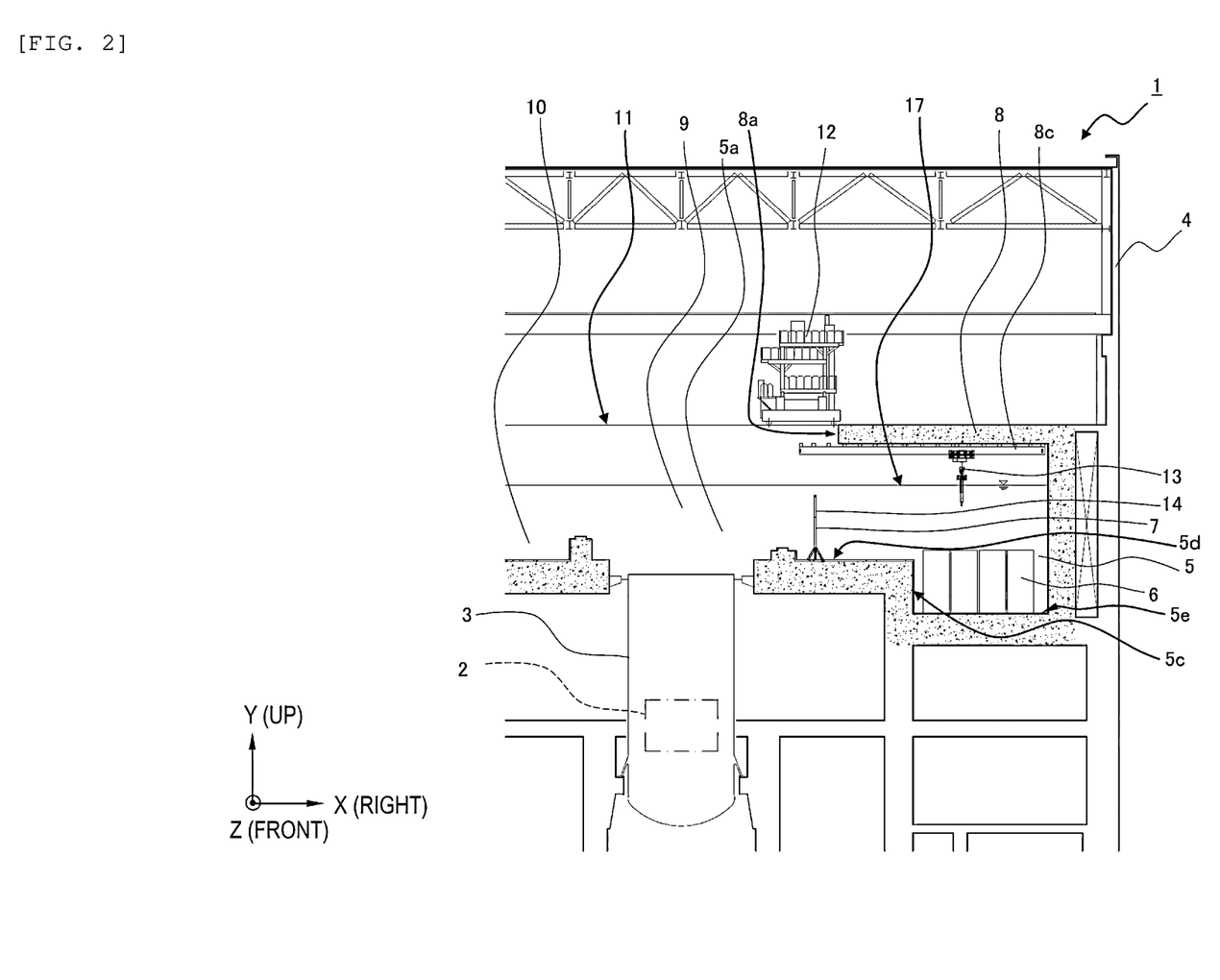
FIG. 2 is a partial cross-sectional view along A-A shown in FIG. 1 during spent fuel removal of the reactor building according to the first embodiment.
Figure 3:
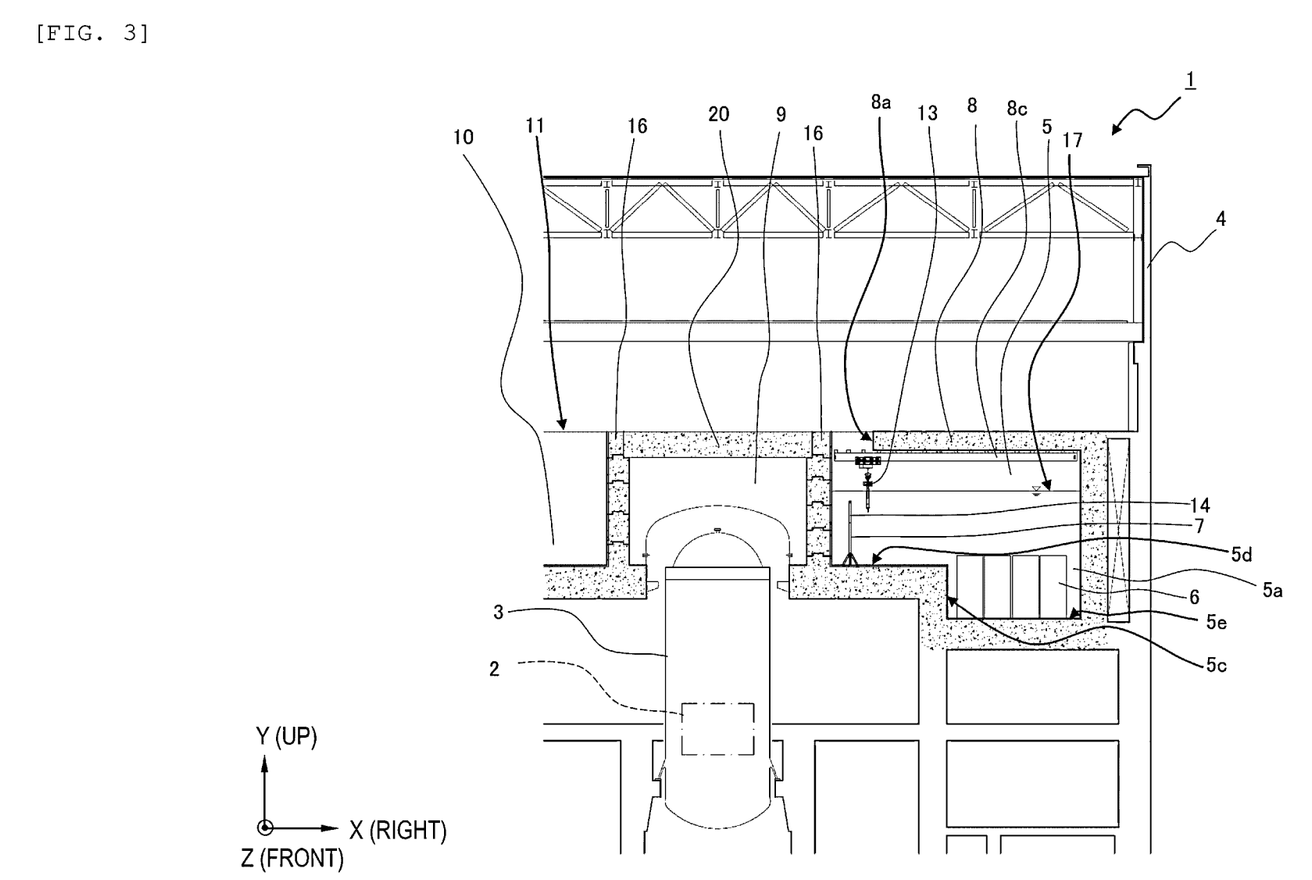
FIG. 3 is a partial cross-sectional view along A-A shown in FIG. 1 before or after the spent fuel removal of the reactor building 1 according to the first embodiment.

FIG. 1 is a plan of an operating deck 11 of a reactor building 1 according to the first embodiment of the invention. FIG. 2 is a partial cross-sectional view along A-A shown in FIG. 1 during spent fuel removal of the reactor building 1 according to the first embodiment. FIG. 3 is a partial cross-sectional view along A-A shown in FIG. 1 before or after the spent fuel removal (hereinafter, referred to as before and after the spent fuel removal) of the reactor building 1 according to the first embodiment.

The reactor building 1 is a building in which a primary containment vessel 3 for accommodating a reactor 2 is housed, and refueling operations of nuclear fuel are performed in the reactor building 1. The reactor building 1 includes external walls and slabs 4, a spent fuel pool 5, spent fuel racks 6, a fuel switching stand 7 (see FIGS. 2 and 3), a protection slab 8, a reactor well 9, an equipment pool 10, the operating deck 11, a fuel handling machine 12 (see FIG. 2), and a fuel transfer machine 13 (see FIGS. 2 and 3).

The external walls and slabs 4 configure a structure that serves as walls and slabs of the reactor building 1 covering and protecting the primary containment vessel 3. The external walls and slabs 4 are built of building materials that prevent a leak of radiation and radiation substances, such as reinforced concrete and steels, and prevent a leak of radioactivity. Especially in recent years, it is necessary to protect safety related systems, structures and components (SSCs) in the reactor building 1 and prevent the leak of radioactivity even if external missiles such as an aircraft collides with the reactor building 1. Therefore, the external walls and slabs 4 are required to be built so as to have higher strength in comparison with that in the prior art, and a build cost increases.

As shown in FIGS. 1 and 3, the spent fuel pool 5 is located adjacent to the reactor well 9 to be described later, specifically, in the vicinity of a +X axis direction side (right side) of the reactor well 9. The spent fuel pool 5 is a space in which a bottom slab is located on a −Y direction side (lower side) with respect to the operating deck 11 to be described later. Cooling water 5a is stored in the spent fuel pool 5.

Internal walls and the bottom slab of the spent fuel pool 5 are formed of reinforced concrete, and a stainless liner for preventing the cooling water from leaking to the outside is attached to surfaces of the internal walls and the bottom slab.

The spent fuel pool 5 stores an assembly 14 of the spent fuel (hereinafter, referred to as a fuel assembly 14) that has been subjected to a reaction in the reactor 2 and has been used up and taken out from the reactor 2. The cooling water 5a is forcibly cooled by a cooling facility (not shown) in order to remove decay heat generated by the fuel assembly 14.

The spent fuel pool 5 is provided with a cask pit 5b (see FIGS. 1 and 4) for accommodating a cask (not shown). The cask is a container for transporting the fuel assembly 14 carried out from the spent fuel pool 5 after a predetermined cooling period.

Figure 4:
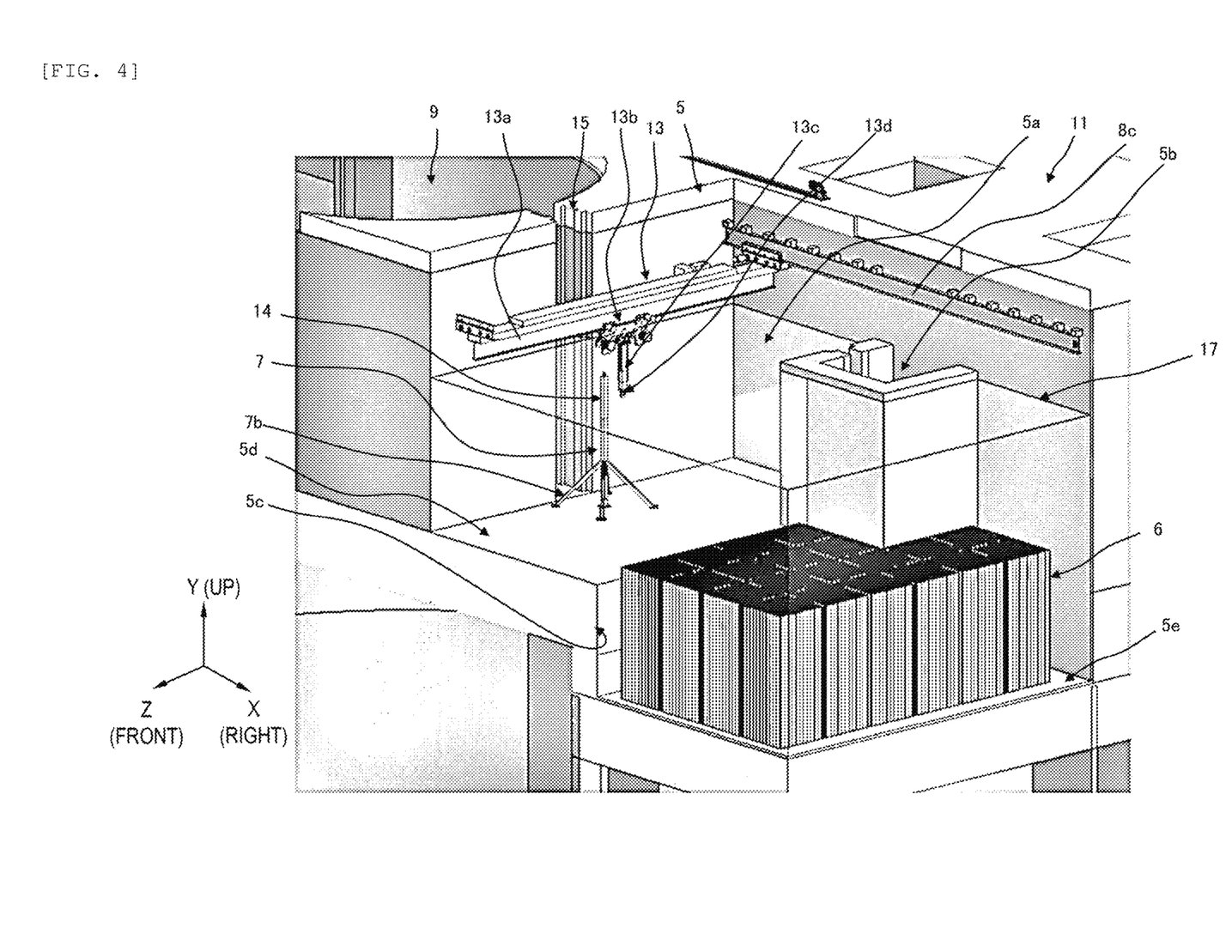
FIG. 4 is a perspective view showing an inside of a spent fuel pool of the reactor building according to the first embodiment.

FIG. 4 is a perspective view showing an inside of the spent fuel pool 5 of the reactor building 1 according to the present embodiment. In FIG. 4, in order to clarify the inside of the spent fuel pool 5, the internal walls of the spent fuel pool 5 on the +X axis direction side and a +Z direction side, and the protection slab 8 are omitted.

As shown in FIG. 4, a first bottom slab 5d located adjacent to the reactor well 9 (that is, near the reactor 2) and a second bottom slab 5e located farther from the reactor 2 than the first bottom slab 5d and having a lower installation height than the first bottom slab 5d are formed on the bottom slab of the spent fuel pool 5. A step 5c is provided on the bottom slab of the spent fuel pool 5 due to the first bottom slab 5d and the second bottom slab 5e.

The spent fuel racks 6 are facilities for accommodating the fuel assembly 14, and have a structure in which square tubes called cells are bundled. The spent fuel racks 6 are fixed in the spent fuel pool 5, and are preferably fixed to, for example, the second bottom slab 5e.

Since the cooling water 5a is stored in the spent fuel pool 5 such that the spent fuel racks 6 are constantly flooded, the fuel assembly 14 accommodated in the spent fuel racks 6 is maintained in a flooded state. The fuel assembly 14 accommodated in the spent fuel racks 6 is stored in a state of maintaining a subcritical state.

Figure 5:
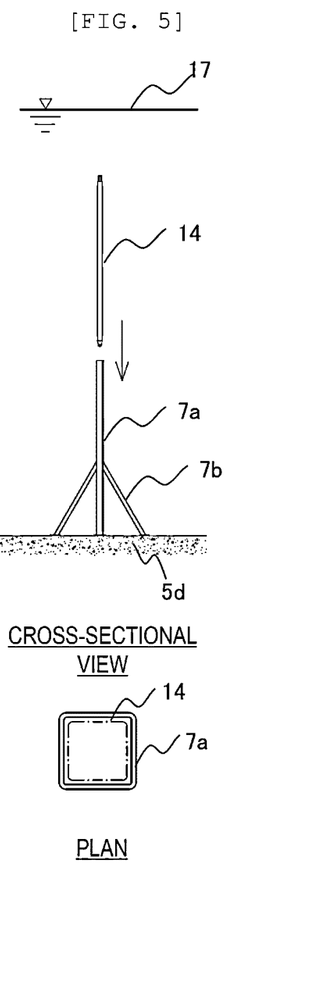
FIG. 5 shows a cross-sectional view and a plan of a fuel switching stand of the reactor building according to the first embodiment.

The fuel switching stand 7 is a device for temporarily placing the fuel assembly 14 taken out from the reactor 2 before moving the fuel assembly 14 to the spent fuel racks 6, and the fuel switching stand 7 is fixed in the spent fuel pool 5. FIG. 5 shows a cross-sectional view and a plan of the fuel switching stand 7 of the reactor building 1 according to the first embodiment.

As shown in FIG. 5, the fuel switching stand 7 is a device for holding the fuel assembly 14 inserted through an opening at a top end of a vertically fixed square tube (cell) 7a. Three or more (four in the embodiment shown in FIG. 4) support legs 7b for vertically supporting the square tube 7a are attached to the fuel switching stand 7. The fuel switching stand 7 is located in the vicinity of the reactor well 9, and the support legs 7b are fixed to the first bottom slab 5d of the spent fuel pool 5 so as not to move or tip over the fuel switching stand 7.

As shown in FIGS. 1 to 3, the protection slab 8 is located above the first bottom slab 5d and the second bottom slab 5e, is a reinforced concrete structure that covers the spent fuel pool 5, and has strength capable of withstanding a falling object caused by, for example, collision with external missiles.

The protection slab 8 is connected to the operating deck 11 to be described later, and a plan is formed by an upper surface of the protection slab 8 and the operating deck 11. That is, the upper surface of the protection slab 8 is a part of the operating deck 11.

A fuel switching opening 8a and a cask pit opening 8b are provided in the protection slab 8. Two travelling rails 8c are attached to a lower surface of the protection slab 8.

The fuel switching opening 8a is located above the fuel switching stand 7 fixed to the first bottom slab 5d, and is a substantially rectangle-shaped opening provided in the protection slab 8. That is, the fuel switching stand 7 is provided below the fuel switching opening 8a. The fuel switching opening 8a is provided at an end portion of the protection slab 8 on a −X axis direction side (left side) (end portion of the protection slab 8 in a direction to the reactor 2). It is preferable that an area of opening of the fuel switching opening 8a is small from the viewpoint of preventing an object from falling into the spent fuel pool 5, and it is preferable to set the area of opening at least smaller than an area of the first bottom slab 5d of the spent fuel pool 5.

The cask pit opening 8b is an opening provided above a cask pit 5b. The cask (not shown) for accommodating the fuel assembly 14 after the predetermined cooling period is carried out from the cask pit 5b through the cask pit opening 8b.

The two traveling rails 8c (in FIG. 4, one of the two traveling rails 8c is omitted in order to clarify the inside of the spent fuel pool 5) are two substantially parallel metal rails (for example, I-beam steel) on which the fuel transfer machine 13 to be described later is movably suspended. The two traveling rails 8c are fixed to the lower surface of the protection slab 8 in a manner of being substantially parallel to each other along an X axis direction so as to sandwich all the spent fuel racks 6 placed on the second bottom slab 5e and the fuel switching stand 7.

The reactor well 9 is a space located at an upper portion of the primary containment vessel 3, and as shown in FIG. 1, the reactor well 9 communicates with the spent fuel pool 5 via a first canal 15 that communicates the reactor well 9 and the spent fuel pool 5. A plurality of slot plugs 16 (see FIG. 3) are laminated on the first canal 15 before and after the spent fuel removal. A stainless gate plate (not shown) is provided on an +X axis direction side (right side) of the slot plugs 16, and the gate plate prevents the cooling water 5a in the spent fuel pool 5 from flowing out to the reactor well 9. On the other hand, the cooling water 5a is injected into the reactor well after the laminated slot plugs 16 are removed from the first canal 15 when the spent fuel removal is started. At a stage in which the reactor well 9 and the spent fuel pool 5 have the same water level, the gate plate of the first canal 15 is removed, and the reactor well 9 and the spent fuel pool 5 are communicated with each other (see FIG. 2). Accordingly, the spent fuel pool 5 and the reactor well 9 become an integral pool filled with the cooling water 5a.

As shown in FIG. 1, the equipment pool 10 is located in the vicinity of a −X axis direction side (left side) of the reactor well 9 to be described later, and the equipment pool 10 is a space in which a bottom slab thereof is located at a −Y direction side (lower side) with respect to the operating deck 11 to be described later. A steam dryer and a steam separator which are internal equipment of the primary containment vessel 3 are temporarily placed in the equipment pool 10 during the spent fuel removal. As shown in FIG. 1, the equipment pool 10 communicates with the reactor well 9 via a second canal 18. The second canal 18 is a canal that communicates the equipment pool 10 and the reactor well 9. A plurality of slot plugs 16 (see FIG. 3) are arranged at the second canal 18 before and after the spent fuel removal, and the equipment pool 10 is separated from the reactor well 9. On the other hand, the slot plugs 16 are removed from the second canal 18 during the spent fuel removal, and the equipment pool 10 and the reactor well 9 are injected with the cooling water 5a to the same level as an initial water surface 17 of the cooling water 5a of the spent fuel pool 5.

The operating deck 11 is a substantially horizontal deck provided above the primary containment vessel 3, and is a deck for performing refueling operations and maintenance. As shown in FIG. 1, the operating deck 11 is provided with a plurality of openings (that is, a reactor well opening 11a, a first canal opening 1ib, an equipment pool opening 11c, and a second canal opening 11d). Two support rails 19 for supporting a bridge (traveling carriage) 12a of the fuel handling machine 12 are arranged on the operating deck 11.

The reactor well opening 11a is a substantially circular opening provided in the operating deck 11 above the reactor well 9. Normally, the reactor well opening 11a is covered by shield plugs 20 (see FIG. 3) which configure a radiation shield divided into a plurality of parts. When the nuclear fuel is to be replaced, the shield plugs 20 are removed and the reactor well opening 11a is open as shown in FIG. 2.

The first canal opening 1ib is an opening provided in the operating deck 11 so as to be located above the first canal 15. As shown in FIG. 1, the fuel switching opening 8a and the reactor well opening 11a communicate with each other via the first canal opening 1ib. That is, the reactor well opening 11a is connected with the fuel switching opening 8a.

The equipment pool opening 11c is a rectangle-shaped opening provided in the operating deck 11 so as to be located above the equipment pool 10. The second canal opening 11d is an opening provided in the operating deck 11 so as to be located above the second canal 18. As shown in FIG. 1, the reactor well opening 11a and the equipment pool opening 11c communicate with each other via the second canal opening 11d.

The two support rails 19 are two rod-shaped steel members that movably support the bridge (traveling carriage) 12a of the fuel handling machine 12 to be described later. The two support rails 19 are provided on the operating deck 11 in parallel along the X axis direction so as to sandwich the fuel switching opening 8a, the reactor well opening 11a, and the equipment pool opening 11c.

Figure 8:
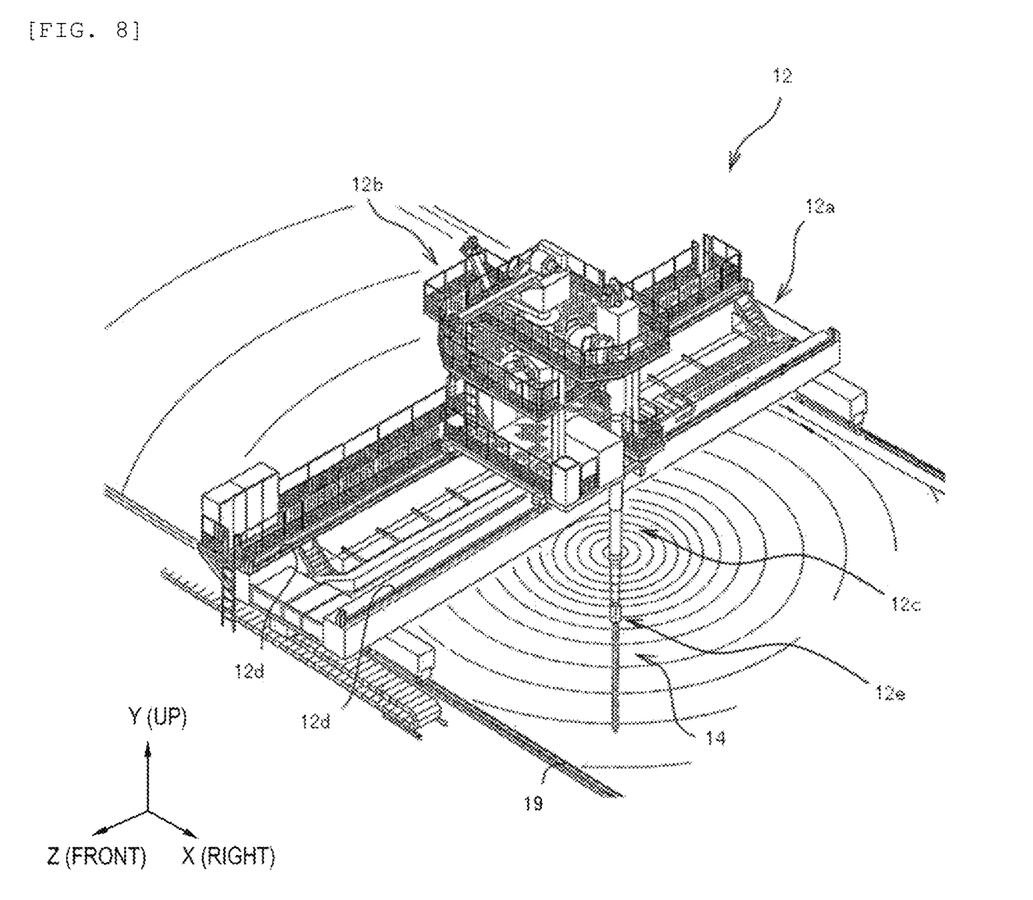
FIG. 8 is a perspective view showing a fuel handling machine of the reactor building according to the first embodiment.

FIG. 8 is a perspective view showing the fuel handling machine 12 of the reactor building 1 according to the present embodiment. The fuel handling machine 12 is a device for moving the fuel assembly 14 from the reactor 2 to the fuel switching stand 7. As shown in FIG. 8, the fuel handling machine 12 includes the bridge (traveling carriage) 12a that moves on the two support rails 19, a trolley (traversing carriage) 12b that moves on the traveling carriage, and a first stretchable tube 12c that is attached to the trolley 12b and is stretchable.

The bridge 12a is provided on the two support rails 19, and is a carriage that moves above the fuel switching opening 8a, the reactor well opening 11a, and the equipment pool opening 11c along the two support rails 19.

The trolley 12b is a carriage that moves on two traversing rails 12d provided at the bridge 12a. A moving direction of the trolley 12b is orthogonal to a moving direction of the bridge 12a. Therefore, the trolley 12b can completely move above the operating deck 11 sandwiched between the two support rails 19.

The first stretchable tube 12c is a rod-shaped stretchable device in which a plurality of circular tubes having different diameters are assembled so as to be stretchable in an axial direction of the circular tubes, and the first stretchable tube 12c is attached to the trolley 12b so as to be stretchable toward a downward side of the trolley 12b. A manipulator 12e for gripping the fuel assembly 14 is provided at a lower end of the first stretchable tube 12c.

The fuel transfer machine 13 shown in FIGS. 2 to 4 is a crane movably provided in the spent fuel pool 5, and is a crane that moves the fuel assembly 14 from the fuel switching stand 7 to the spent fuel racks 6, for example, a suspension crane as shown in FIG. 4 can be used. The fuel transfer machine 13 in FIG. 4 includes a traversing rail 13a, a traversing machine 13b, and a second stretchable tube 13c.

The traversing rail 13a is a device that hangs from the two travelling rails 8c fixed to the lower surface of the protection slab 8 and moves above the spent fuel racks 6 and the fuel switching stand 7 along the two travelling rails 8c.

The traversing machine 13b is a device that hangs from the traversing rail 13a and moves along the traversing rail 13a, and moves in a direction orthogonal to a moving direction of the traversing rail 13a. Therefore, the traversing machine 13b can completely move below the protection slab 8 sandwiched between the two travelling rails 8c. The second stretchable tube 13c is attached to the traversing machine 13b.

The second stretchable tube 13c is a rod-shaped stretchable device such as a miniaturized first stretchable tube 12c. The second stretchable tube 13c is attached to the traversing machine 13b so as to be stretchable in a vertical direction below the traversing machine 13b. Similar to the first stretchable tube 12c, a manipulator 13d for gripping the fuel assembly 14 is provided at a lower end of the second stretchable tube 13c.

[Operations]

A procedure of the spent fuel removal in the reactor building 1 according to the present embodiment will be described below.

First, the shield plugs 20 and the slot plugs 16 are removed by a large overhead crane (not shown) above the fuel handling machine 12. In addition to an upper lid of the primary containment vessel 3, the steam dryer and the steam separator which are the internal equipment of the primary containment vessel 3 are removed such that the fuel assembly 14 can be taken out from the reactor 2.

Next, the cooling water 5a is injected into the reactor well 9 and the equipment pool 10. The injection of the cooling water is stopped at the stage in which the reactor well 9 and the equipment pool 10 have the same level as the initial water surface 17 of the spent fuel pool 5, and the gate plate of the first canal 15 is removed, whereby an integral pool is acquired in which the reactor well 9, the equipment pool 10, and the spent fuel pool 5 communicate with each other.

Further, the first stretchable tube 12c of the fuel handling machine 12 is moved above the reactor 2 by moving the bridge 12a and the trolley 12b. Then, the first stretchable tube 12c is stretched downward, and the fuel assembly 14 in the reactor 2 is gripped by the manipulator 12e. Then, the first stretchable tube 12c is shrunk and the fuel assembly 14 is moved from the inside of the reactor 2 into the cooling water 5a in the reactor well 9.

Then, the bridge 12a is traveled toward the spent fuel pool 5 along the two support rails 19 while the fuel assembly 14 gripped by the manipulator 12e is flooded in the cooling water 5a, whereby the fuel assembly 14 is moved from the reactor well 9 into the spent fuel pool 5 via the first canal 15, and the fuel assembly 14 is moved above the fuel switching stand 7.

Next, the first stretchable tube 12c is stretched downward, and the fuel assembly 14 is temporarily placed in the square tube 7a of the fuel switching stand 7. Then, the manipulator 12e is removed from the fuel assembly 14, the first stretchable tube 12c is shrunk, and the manipulator 12e is moved to above the fuel transfer machine 13.

Next, the second stretchable tube 13c of the fuel transfer machine 13 is moved above the fuel switching stand 7 by operating the traversing rail 13a and the traversing machine 13b. Then, the second stretchable tube 13c is stretched downward, and the fuel assembly 14 temporarily placed in the fuel switching stand 7 is gripped by the manipulator 13d. Then, the second stretchable tube 13c is shrunk and the fuel assembly is withdrawn from the fuel switching stand 7 while being immersed in the cooling water 5a.

Next, the traversing rail 13a is traveled along the two travelling rails 8c, and the fuel assembly 14 is moved above the spent fuel racks 6 as a storage destination while being flooded in the cooling water 5a. Then, the second stretchable tube 13c is stretched downward, and the fuel assembly 14 is accommodated in the spent fuel racks 6 as the storage destination.

[Effects]

Figure 9:
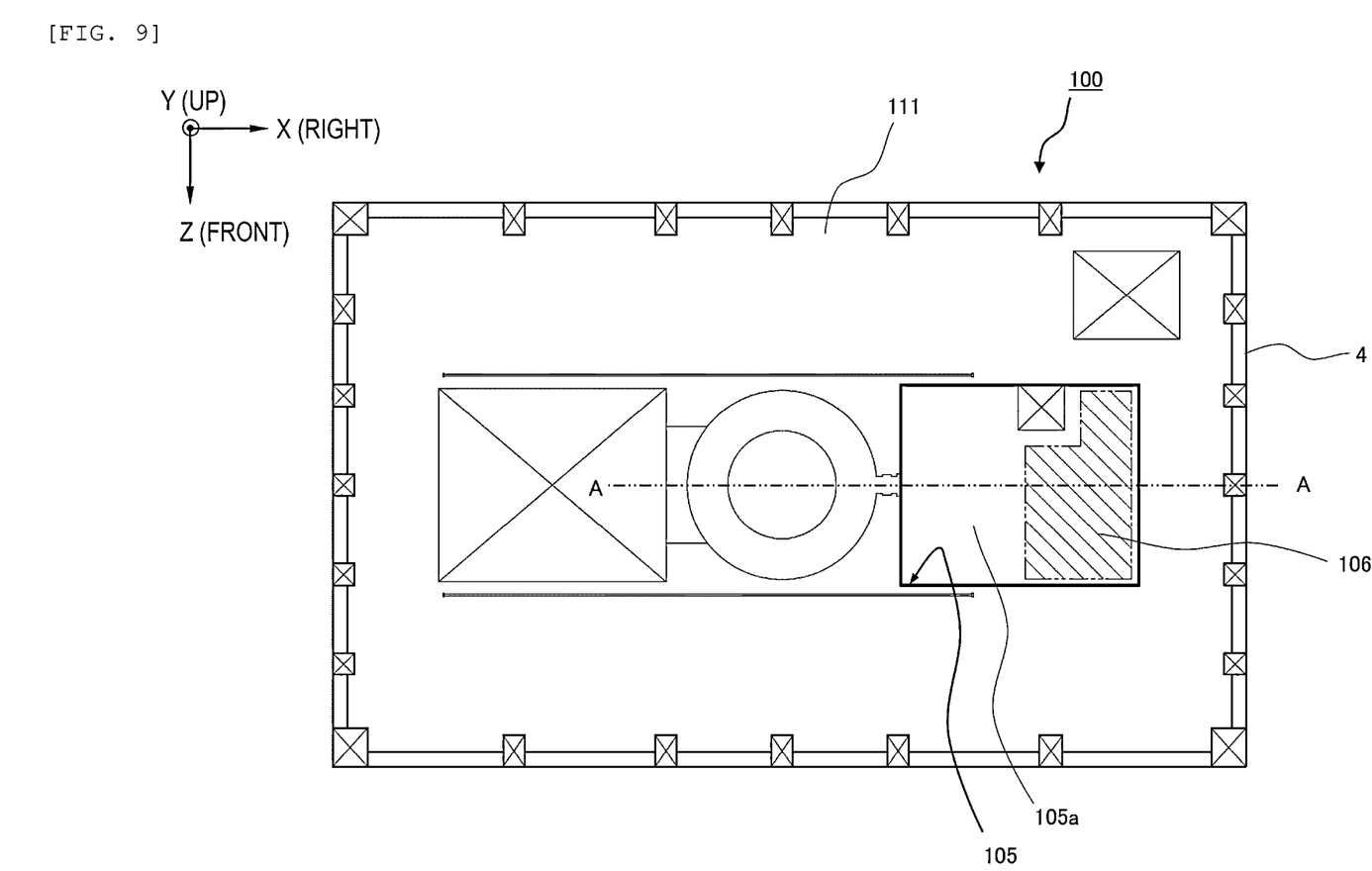
FIG. 9 is a plan showing an operating deck of a reactor building according to a comparative example.
Figure 10:
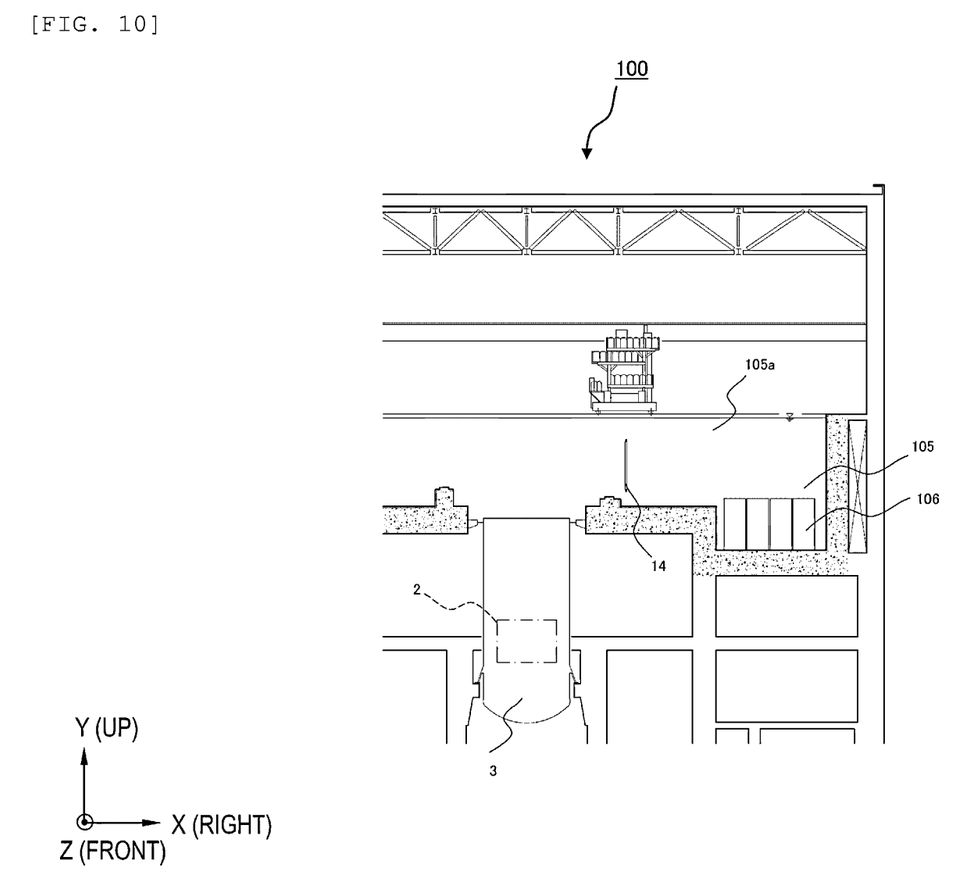
FIG. 10 is a partial cross-sectional view along A-A shown in FIG. 9 during spent fuel removal of the reactor building according to the comparative example.
Figure 11:
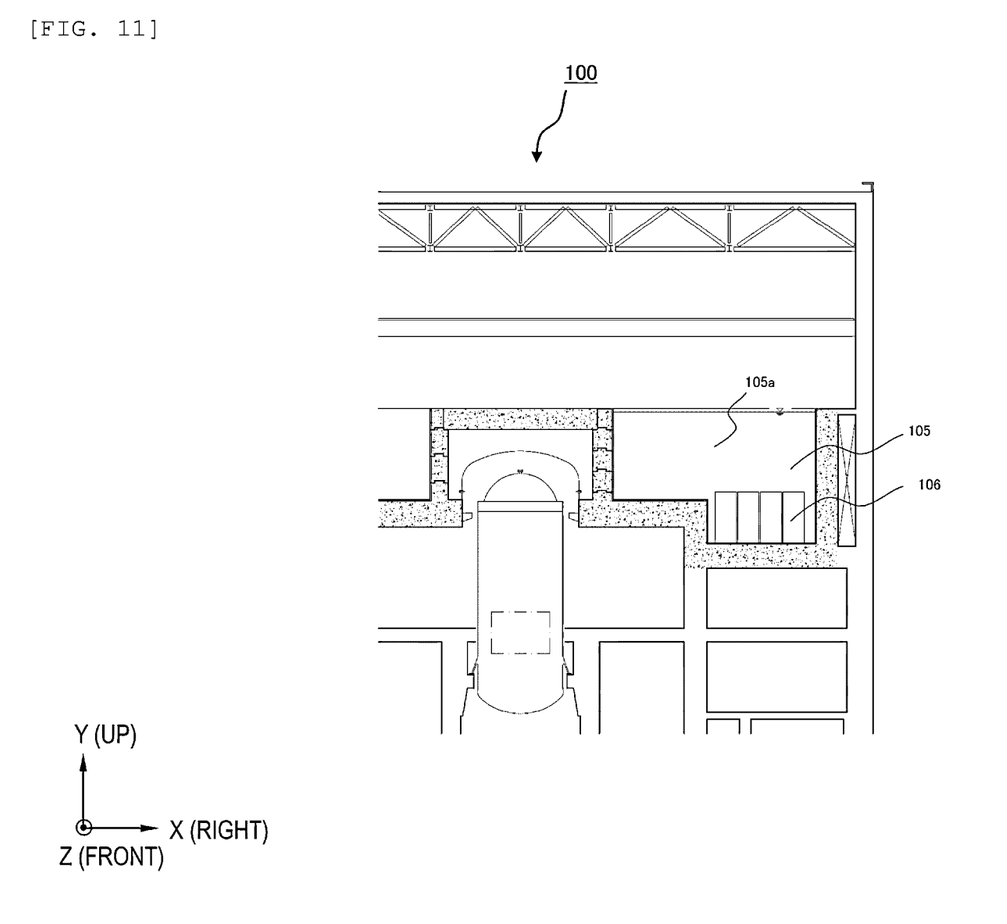
FIG. 11 is a partial cross-sectional view along A-A shown in FIG. 9 before or after the spent fuel removal of the reactor building according to the comparative example.

FIG. 9 is a plan showing an operating deck 111 of a reactor building 100 according to a comparative example. FIG. 10 is a partial cross-sectional view along A-A shown in FIG. 9 during spent fuel removal of the reactor building 100 according to the comparative example. FIG. 11 is a partial cross-sectional view along A-A shown in FIG. 9 before or after the spent fuel removal of the reactor building 100 according to the comparative example.

As shown in FIGS. 9 to 11, in the reactor building 100 according to the comparative example, the protection slab 8 is not provided at an upper portion of a spent fuel pool 105, and the spent fuel pool 105 is open. Therefore, it is not possible to prevent an object such as external missiles from falling into the spent fuel pool 105.

In the reactor building 1 according to the present embodiment, the robust protection slab 8 covers above the spent fuel pool 5. Therefore, even if an object such as external missiles destroys the reactor building 1 and falls into the spent fuel pool 5, direct contact between the fuel assembly 14 in the spent fuel pool 5 and the object can be prevented by the protection slab 8. Accordingly, it is possible to prevent the occurrence of a damage to the fuel assembly 14 due to a falling object falling into the spent fuel pool 5, the leak of the cooling water 5a due to a damage to the stainless liner attached to the spent fuel pool 5, or the like. Further, in the present embodiment, it is not necessary to further strengthen the external walls and slabs 4 of the reactor building 1 in order to prevent the intrusion of a falling object such as external missiles into the reactor building 1. Therefore, it is sufficient that the external walls and slabs 4 of the reactor building 1 have minimum strength for securing required performances in terms of seismic resistance and shielding, and the build cost of the reactor building 1 can be reduced. In addition, an upper portion of the reactor building 1 can be made lighter, and the stability against earthquake can be increased.

In the present embodiment, the protection slab 8 constantly covers an upper portion of the spent fuel pool, and thus it is not necessary to remove shielding blocks for opening from the upper opening of the spent fuel pool or to secure a space for temporarily storing the removed shielding blocks for opening upon starting the spent fuel removal as in PTL 1. That is, according to the present embodiment, it is possible to shorten the time required for the spent fuel removal while protecting the spent fuel stored in the spent fuel pool from a falling object.

In the reactor building 1 according to the present embodiment, the upper surface of the protection slab 8 is a part of the operating deck 11, and thus a deck area of the operating deck can be increased in comparison with the prior art. Therefore, in the refueling operations and the maintenance, it is possible to operate in a wider space and it is possible to achieve an improvement in operation efficiency and an exposure reduction for an operator due to shortening of the operation time.

The fuel switching stand 7 is fixed in the spent fuel pool 5 adjacent to the reactor well 9. Therefore, a movement amount of the fuel handling machine 12 used for taking out the fuel assembly 14 from the reactor 2 and moving the fuel assembly 14 to the fuel switching stand 7 is reduced, and the operation time of the fuel handling machine 12 can be shortened. Since the fuel switching stand 7 is fixed to the first bottom slab 5d, the tipping over and movement of the fuel switching stand 7 can be prevented.

The spent fuel racks 6 in which the fuel assembly 14 is housed are fixed to the second bottom slab 5e of the spent fuel pool 5. Since the second bottom slab 5e is provided at a location lower than the first bottom slab 5d on which the fuel switching stand 7 is placed, the fuel assembly 14 can be easily moved to the spent fuel racks 6 by the fuel transfer machine 13. A height can be sufficiently secured from a top end of the fuel assembly 14 in the spent fuel racks 6 to the water surface 17 of the cooling water 5a, and even if the cooling water 5a is reduced, the flooded state of the fuel assembly 14 can be maintained.

The protection slab 8 of the present embodiment is provided with the fuel switching opening 8a. Therefore, by moving the fuel handling machine 12 in a state where the fuel assembly 14 is gripped by the first stretchable tube 12c to the fuel switching opening 8a, it is easy to move the fuel assembly 14 into the spent fuel pool 5 covered by the protection slab 8.

The fuel switching stand 7 and the fuel transfer machine 13 are provided in the spent fuel pool 5. Therefore, in the spent fuel pool 5 covered by the protection slab 8, the fuel assembly 14 accommodated in the fuel switching stand 7 can be moved into the spent fuel racks 6.

Since the protection slab 8 is provided with the fuel switching opening 8a, even if the cooling water of the spent fuel pool 5 boils, steam can be discharged to the outside of the spent fuel pool 5.

The fuel switching opening 8a is provided at the end portion of the protection slab 8 on the reactor 2 side. The spent fuel racks 6 are arranged below the protection slab 8 located in the direction away from the reactor 2 (+X axis direction side (right side)) with respect to the location of the fuel switching opening 8a. Therefore, even if there is a falling object on the protection slab 8, direct contact between the falling object and the spent fuel racks 6 is avoided, and only a falling object that passes through the fuel switching opening 8a may enter the spent fuel pool 5 and come into contact with the spent fuel racks 6. Therefore, a possibility that the fuel assembly 14 stored in the spent fuel racks 6 comes into contact with a falling object can be reduced in comparison with the prior art.

The area of opening of the fuel switching opening 8a is at least smaller than the area of the first bottom slab 5d of the spent fuel pool 5. That is, since the area of the protection slab 8 covering the spent fuel pool 5 is at least larger than the area of the second bottom slab 5e, falling of an object into the spent fuel pool 5 can be prevented in comparison with the prior art.

The first canal opening 11b communicating the reactor well opening 11a and the fuel switching opening 8a is provided in the operating deck 11 of the present embodiment. Therefore, by moving the fuel handling machine 12 in the state where the fuel assembly 14 is gripped by the first stretchable tube 12c from above the reactor well opening 11a to above the fuel switching opening 8a via above the first canal opening 11a, it is easy to move the fuel assembly 14 from the reactor well 9 into the spent fuel pool 5 without withdrawing the fuel assembly 14 from the cooling water 5a.

Second Embodiment

Figure 6:
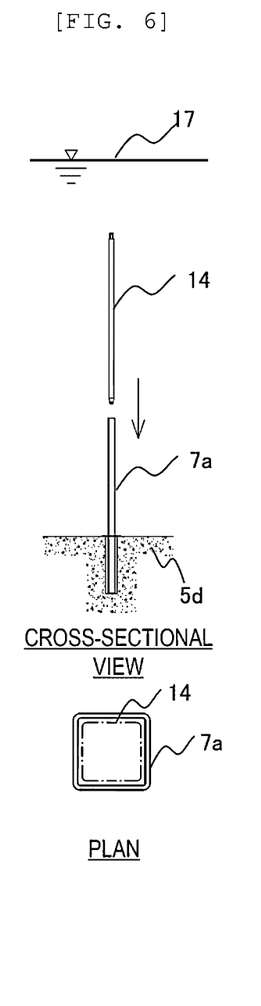
FIG. 6 shows a cross-sectional view and a plan of a fuel switching stand of a reactor building according to a second embodiment.

FIG. 6 shows a cross-sectional view and a plan of the fuel switching stand 7 of the reactor building 1 according to a second embodiment. A difference between the fuel switching stand 7 according to the present embodiment and the fuel switching stand 7 according to the first embodiment is that the support legs 7b are not provided, and a lower portion of the square tube 7a is embedded in the first bottom slab 5d of the spent fuel pool 5 and is fixed vertically.

[Effects]

The fuel switching stand 7 according to the present embodiment can be provided at a location lower than the fuel switching stand 7 according to the first embodiment. Therefore, the water surface 17 of the cooling water 5a of the spent fuel pool 5 can be made lower than that of the first embodiment.

Third Embodiment

Figure 7:
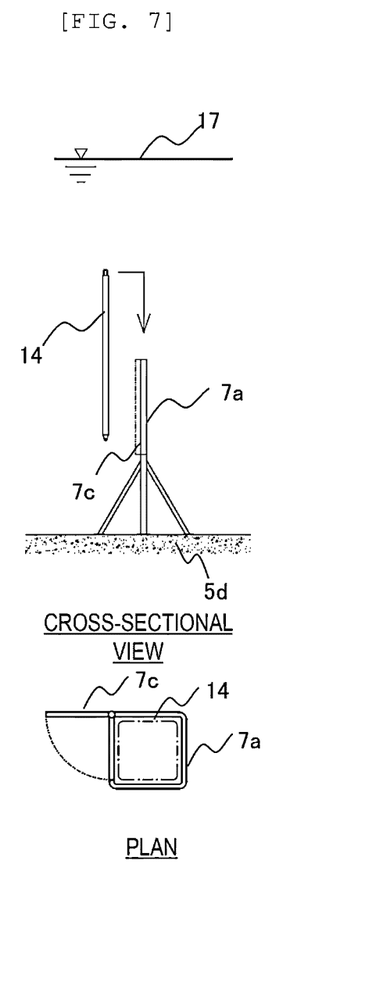
FIG. 7 shows a cross-sectional view and a plan of a fuel switching stand of a reactor building according to a third embodiment.

FIG. 7 shows a cross-sectional view and a plan of the fuel switching stand 7 of the reactor building 1 according to a third embodiment. A difference between the fuel switching stand 7 according to the present embodiment and the fuel switching stand 7 according to the first embodiment is that a sidewall 7c which opens above the square tube 7a is provided.

[Effects]

In the fuel switching stand 7 according to the present embodiment, one of sidewalls of the square tube 7a is the openable sidewall 7c. If the sidewall 7c opens when the fuel assembly 14 is moved to the fuel switching stand 7, the fuel assembly 14 can be moved into the square tube 7a from a side of the sidewall 7c. Accordingly, as compared with the first embodiment and the second embodiment in which the fuel assembly 14 can be moved only from the top end of the square tube 7a, the fuel assembly 14 can be moved to the fuel switching stand 7 without being exposed from the water surface 17, and the water surface 17 of the cooling water can be lowered. Especially, when combined with the second embodiment, the height of the water surface 17 can be reduced as compared with the second embodiment.

The invention is not limited to the embodiments described above and includes various modifications. For example, the embodiments described above have been described in detail for easy understanding of the invention, and are not necessarily limited to those including all the configurations described above. A part of configurations of an embodiment may be replaced with configurations of another embodiment, or the configurations of another embodiment may be added to the configurations of the embodiment. In addition, a part of the configuration of each embodiment can be added, deleted, or replaced with other configurations.

The embodiments of the invention may have the following aspects. That is, in the present embodiment, the fuel transfer machine 13 which uses the suspension crane is shown, and in the suspension crane, the traversing rail 13a hangs from the two travelling rails 8c fixed to the lower surface of the protection slab 8. However, the two traveling rails 8c may be fixed to two opposing sidewalls (a pair of internal walls) in the spent fuel pool 5, and a crane (for example, an overhead crane) that is movable by both ends of the traversing rail 13a traveling on the two traveling rails 8c may be used.

REFERENCE SIGN LIST 1 reactor building
2 reactor
5 spent fuel pool
5d first bottom slab
5e second bottom slab
6 spent fuel rack
7 fuel switching stand
8 protection slab
8a fuel switching opening
8c travelling rail (rail of fuel transfer machine)
9 reactor well
11 operating deck
12 fuel handling machine
13 fuel transfer machine
14 assembly of spent fuel (fuel assembly)

The invention claimed is:

1. A reactor building, comprising:
a spent fuel pool;
spent fuel racks located in the spent fuel pool and configured to store spent fuel;
a protection slab located above the spent fuel racks; and
traveling rails fixed to a lower surface of the protection slab, wherein
the traveling rails are parallel to each other, and
the spent fuel racks being located between the traveling rails.

2. The reactor building according to claim 1, further comprising:
a fuel switching stand fixed inside the spent fuel pool;
a fuel handling machine configured to take out a spent fuel in a reactor and move the taken-out spent fuel to the fuel switching stand; and
a fuel transfer machine movably provided in the spent fuel pool and configured to move, to the spent fuel racks, the spent fuel moved to the fuel switching stand.

3. The reactor building according to claim 2, wherein the fuel transfer machine has a traversing rail connected to the traveling rails.

4. The reactor building according to claim 2, wherein
on a bottom slab of the spent fuel pool, the fuel switching stand is fixed to a first bottom slab located adjacent to a reactor well.

5. The reactor building according to claim 4, wherein
on the bottom slab of the spent fuel pool, the spent fuel racks are fixed to a second bottom slab lower in height than the first bottom slab.

6. The reactor building according to claim 2, further comprising:
an operating deck, wherein
the protection slab is connected to the operating deck, and
an upper surface of the protection slab is a part of the operating deck.

7. The reactor building according to claim 2, wherein
a fuel switching opening is provided at a portion of the protection slab located above the fuel switching stand.

8. The reactor building according to claim 7, wherein
the fuel switching opening is provided at an end portion of the protection slab on a reactor side, and
the spent fuel racks are arranged below the protection slab.

9. The reactor building according to claim 6, wherein
a reactor well,
a reactor well opening is provided in the operating deck above the reactor well,
a fuel switching opening is provided at a portion of the protection slab located above the fuel switching stand, and
the reactor well opening and the fuel switching opening are connected to each other.

10. The reactor building according to claim 4, wherein
a fuel switching opening is provided at a portion of the protection slab located above the fuel switching stand, and
an area of the fuel switching opening is smaller than an area of the first bottom slab.

11. The reactor building according to claim 2, wherein
a lower portion of the fuel switching stand is embedded in a bottom slab of the spent fuel pool.

12. The reactor building according to claim 2, wherein
an openable sidewall is provided at an upper portion of the fuel switching stand.

* * * * *